G. W. LANDON
Millstone Bush.
No. 41,928. Patented March 15, 1864.
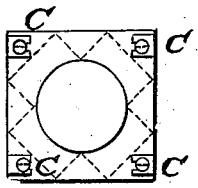
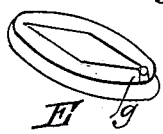
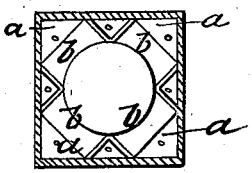
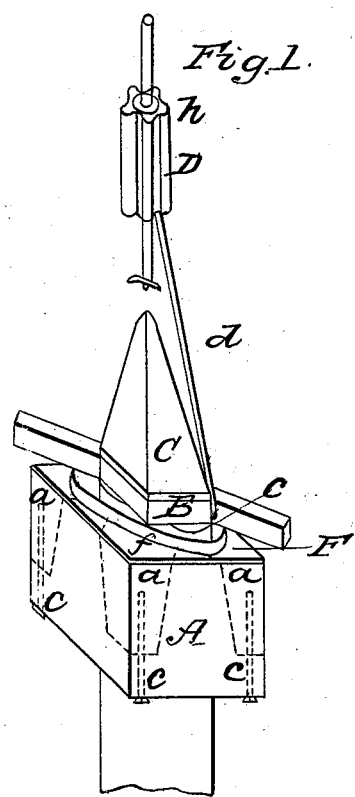
WITNESSES
Thomas Cosby
David Litson.
INVENTOR
Geo. W. Landon.

UNITED STATES PATENT OFFICE.

GEORGE W. LANDON, OF GRAHAM, INDIANA.

IMPROVEMENT IN MILLSTONE-BUSHES.

Specification forming part of Letters Patent No. 41,928, dated March 15, 1864.

*To all whom it may concern:*

Be it known that I, GEORGE W. LANDON, of Graham, in the county of Jefferson, in the State of Indiana, have invented a new and useful Improvement in the Millstone-Bushes; and I do hereby declare that the following is a full, clear, and exact description of the construction and use of the same, reference being had to the annexed drawings, making a part of this specification, in which—

Figure 1 is a perspective view with the lid E removed; Fig. 2, a top view with the plate F removed; Fig. 3, the lid for Fig. 1, and Fig. 4 a view of the bottom of the bush.

In the figures, A is the casing of the bush; B, the driver; C, the point of the spindle; D, the damsel; $a\,a\,a$, &c., four triangular keys, adjustable up or down by means of the set-screws $c\,c\,c$, &c., to tighten or loosen the spindle-collar, as desired. $d$ is a long tube, the upper end of which fits over another which leads from the circular trough covered by the lid $h$ down through the damsel, and its lower end enters the short tube $g$ on the lid E, those tubes and the circular trough forming the arrangement for oiling the collar $e$ of the spindle. $b\,b\,b\,b$ are the journal-blocks. $f$ is a rim on the plate F, nearly as high as the top of the collar and encircling it, forming a dish around it to receive oil when poured down the tubes.

The lid E is made to fit neatly the square of the spindle under the driver, and extends out and is cupped down over the rim $f$ to near its base, fits loosely, and turns with the spindle.

The lid $h$ fits loosely over the circular trough and the axis of the damsel, and may be lifted up with one hand and oil poured in with the other.

To enable others to make and use my invention, the following description is given.

I make the casing of my bush of any suitable kind of metal, in a square form, of proper dimensions, with four right-angled cones on the inside to form the seats for the journal-blocks. These cones are plugged with wood or other material, or otherwise made solid, and the top plate is screwed down to them. I make the journal-blocks of any desired material, and fit them neatly in their seats, so that they may be moved to or from the collar, as desired, by means of the keys, which are also of any desired material. The lid E is made of sheet-iron, brass, or copper, or other suitable metal. The damsel may be made in the form of a fluted cylinder, or of a trundle, and the tubes and circular trough of any kind of sheet metal.

The advantages of my bush are, first, the spindle may be tightened, if it gets too loose by wearing, when the mill is running, without throwing it the least out of the tram; second, the collar may be oiled at any time when the mill is in motion; third, every particle of dust is excluded from the collar; fourth, by the position of the journal-blocks I get them larger and the casing smaller than in any other position.

I do not claim the casing, spindle, driver, or blocks as my invention.

What I claim as my invention is—

The journal-blocks $b\,b\,b\,b$ and keys $a\,a\,a\,a$, when set in a position diagonally opposite each other, the set-screws $c\,c\,c$, &c., the rim $f$, the lid E, the tube $d$, and the damsel D, when constructed with the lubricating apparatus, when used in combination for the purpose above described and set forth.

GEO. W. LANDON.

Witnesses:
 THOMAS COSBY,
 DAVID LITSON.